3,305,398
METHOD FOR MAKING NICKEL ELECTRODES FOR ELECTROLYTIC CELLS
Charles Victor Herold, Paris, France, Karl Ackermann, deceased, late of Mannheim, Germany, by Karl Siebert, legal representative, Kubach, near Lahr, Germany, assignors, by direct and mesne assignments, to Societe des Accumulateurs Fixes et de Traction (Société Anonyme), Romainville, Seine, France, a company of France
Filed July 23, 1965, Ser. No. 475,324
Claims priority, application France, Aug. 3, 1962, 906,038; July 3, 1963, 940,270; July 4, 1963, 940,434
9 Claims. (Cl. 136—29)

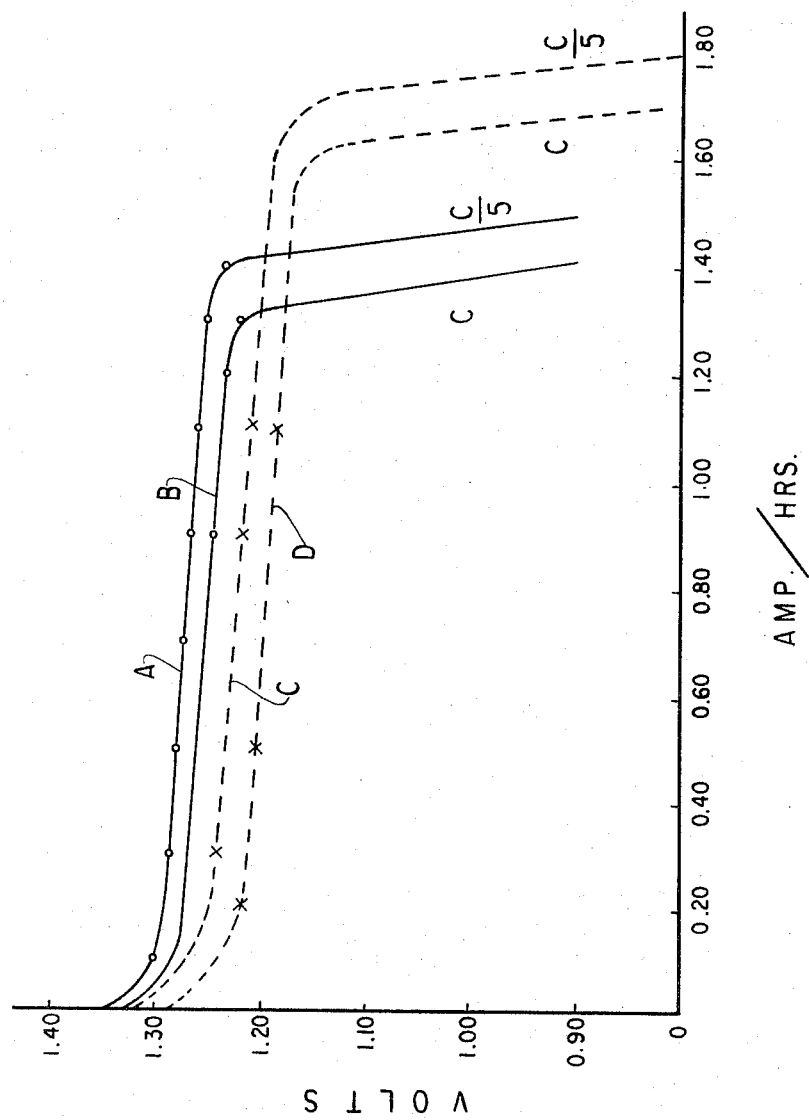

This application is a continuation-in-part of our co-pending application, Serial No. 298,664, filed July 30, 1963.

The present invention relates essentially to a method of manufacturing electrodes for electrolytic cells, electric storage batteries and similar applications, of the type wherein the electrode-forming plate comprises a porous metallic support in the pores of which active materials are contained.

Alkaline accumulators provided with electrodes consisting of an electro-chemically inactive, porous support in the pores of which the active material is embedded have found extensive application in specialized areas. For the positive electrodes of such accumulators one uses porous plates produced by the sintering of powdered nickel. The electrochemically active mass in the pores consists, essentially, of nickel hydroxide and should be distributed as uniformly as possible throughout the entire cross-section of the plate.

According to an impregnation process heretofore used, the active material is placed in the pores by impregnating the support with a concentrated nickel-salt solution, and the nickel is precipitated by means of an alkaline solution in the form of nickel hydroxide. This is followed by washing and drying of the support. However, this process is time-consuming and cumbersome in view of the fact that these operational phases have to be repeated several times in order to provide the electrodes with an adequate capacity.

On the other hand, it has also been proposed to deposit the active material by means of an electrochemical process. In this case, the support is immersed into an electrolyte containing a salt of the metal to be used as the active mass, and the plate is subsequently subjected to a cathodic polarization. As the operation is carried out in an aqueous solution, a deposit of the desired metal oxide or hydroxide is formed inside the pores. This method, which dates from 1936, was not satisfactory because the pore filling was far from perfect.

Recently, a process became known by means of which the metallic electrode support itself is utilized for the formation of the active material, in other words, there is no further dependence on an external supply of a nickel nitrate solution. In that process, the salt of a weakly basic metal in an aqueous solution and, subsequently, the hydroxide of an alkali metal in an aqueous solution are allowed to act successively on the electrode support. Thereafter, the support is washed in water. It was found that a concentrated aluminum nitrate solution is particularly suitable for the treatment of the electrode support. The basic aluminum compounds produced by the action of such a solution on the support are to a large extent removed by washing in the subsequent treatment with alkaline solutions. With this process one achieves, already in a single treatment of the electrode support, capacities comparable to the capacity of an identical electrode that was impregnated four times with a nickel nitrate solution according to the above-described process.

It was now found that, in the activating of the electrode support through the action of a salt of aluminum, e.g., aluminum nitrate solution, the plates or supports being first immersed in this solution followed by dipping in an aqueous solution of hydroxides of an alkali metal, such as, for instance, potassium hydroxide, superior results could be achieved if the aluminum nitrate solution was allowed to act on the electrode support in an atmosphere of saturated steam. In other words, the idea consists in "using" the support proper for the formation of hydrated nickel aluminate which is to be the active material. This method is carried out by using a solution of a salt of aluminum, preferably a nitrate, the plate being immersed in this solution. When the pore filling is completed, the plate is subsequently exposed to a warm and steam saturated atmosphere, an exothermic reaction takes place which is attended by the release of gas. The reaction may last several hours.

The walls of the pores are attacked by the aluminum salt, and when the reaction is completed they are lined with hydrated nickel aluminate. A simple drying step is sufficient to complete the operation. This may be followed thereafter, if desired, by simply dipping the plate into an alkali solution to eliminate the undesirable salts which have built up during the reaction.

The method according to this invention avoids all the drawbacks of conventional processes set forth hereinabove and permits the production of plates of the type specified under the most economical and advantageous conditions, the resulting plates having at the same time a considerably greater capacity.

In the drawings:

The figure is a graph of discharge curves illustrating advantages of electrodes prepared according to this invention, as compared with those produced by a known process. The method of this invention is remarkable notably in that it comprises the step of forming the hydrated nickel aluminates by attacking the nickel support directly by means of a salt of aluminum in an aqueous solution and allowing this salt to act on the support in an atmosphere of saturated steam, after which the plate is dried. Subsequently, if desired, as a second step, the plate resulting from the first operating step may be treated by simply immersing it for a determined period of time, e.g., one-half hour in a hot aqueous solution of an alkali hydroxide, and then washing and drying.

The activating salt solution used in the principal step is a solution of a salt of aluminum and a strong oxidizing acid. Aluminum nitrate, preferably, or aluminum chlorate are suitable as activating salts. The solution may contain a single activating salt preferably aluminum nitrate.

The results obtained by carrying out the method of this invention are quite remarkable. In fact, plates are obtained under very economical conditions and have capacity values at least equal to those of the plates obtained according to the conventional methods after six or seven successive impregnations, the capacity of these plates remaining constant even after several hundred charges and discharges, while at the same time avoiding the disadvantages of prior methods which, although perhaps easier to carry out, are less satisfactory from the point of view of the final result.

Of course, this invention is also concerned, by way of novel industrial products, with the plates and electrodes of all types obtained with the method set forth hereinabove.

In a preferred process of practicing the invention, the electrode support is immersed in a solution of concentrated aluminum nitrate and allowed to remain about 2 to 5 minutes in this solution. Subsequently, the support is taken out of the solution and excess solution is allowed to drip off. Now, the aluminum nitrate solution is allowed to act on the electrode support in an atmosphere of saturated steam from a suitable supply at temperatures superior to room temperatures, e.g., about 50 to 100° C. The duration of the action depends on the temperature selected and may amount to about 1 to 2 hours. The resultant product is then dried. If desired, although this is not essential, subsequently the support is immersed for about one-half hour in a hot aqueous solution of an alkali hydroxide, and is then washed in water and again dried.

With the process according to the invention, in a single treatment, about one-third of the metal originally contained in the support is attacked and converted into hydrated nickel aluminate. During the discharge of the electrodes manufactured according to the invention, potentials are achieved that are about 50 mv. higher than those of electrodes into which the active material was placed by an impregnation with nickel nitrate solution followed by a precipitation of the nickel in the form of nickel hydroxide by treatment with aqueous solutions of alkali liquids. The capacity of the electrodes manufactured according to the process of the invention is about 0.38 to 0.40 Ah/g. $Ni(OH)_2$ supposing the divalent nickel of the aluminate in the hydroxide state and depends on the amount of aluminum contained in the electrode in the form of nickel aluminate. By comparison, with an electrode activated according to the impregnating processes hitherto known, the capacity achieved per gram of $Ni(OH)_2$ attains only 0.288 Ah in the best circumstances. These relationships are illustrated in greater detail by the following tables:

| Manufacture of the active material by means of: | Aluminum content, computed as $Al(OH)_3$ Percent of active material | Ampere-hours per gram of $Ni(OH)_2$ |
| --- | --- | --- |
| Impregnation with nickel nitrate solution | 0 | 0.29 |
| Action of an aluminum nitrate solution in an atmosphere of saturated steam | 14 | ¹0.33 |
| | 17.7 | ¹0.35 |
| | 22 | ¹0.49 |

¹ These values are adjusted to correspond to 1 g. $Ni(OH)_2$.

The following table indicates the voltage of accumulators discharged 50%, in which the respective discharge was carried out at a discharge current intensity corresponding to ⅕ of the capacity.

| Manufacture of the active material by means of: | Aluminum content of the active material computed as $Al(OH)_3$ Percent of active material | Accumulator voltage |
| --- | --- | --- |
| Impregnation with nickel nitrate solution | 0 | 1.20 |
| Action of an aluminum nitrate solution in an atmosphere of saturated steam | 15.4 | 1.25 |
| | 16.6 | 1.25 |
| | 18.6 | 1.25 |

An example illustrating the manner in which the method of the invention may be carried out in practice will now be described:

*Example*

A porous plate manufactured by sintering of carbonyl nickel powder and having an active area of 40 sq. cm. and a thickness of 0.9 mm. is immersed for 2 minutes in a solution heated to 70–80° C., which contains per one part of water, three parts of crystallized aluminum nitrate. Following draining of the excess solution, the aluminum nitrate solution is allowed to act on the plate for about 1½ to 2 hours in a pure, 75–80° C. warm atmosphere of saturated steam.

Optionally, following drying of the plate, the latter is immersed for 30 minutes in a 25% aqueous potassium hydroxide solution at 80° C. then washed and dried.

The active material produced by the attack of 35–40% of the nickel content of the plate contains about 10% aluminum, reckoned as $Al(OH)_3$. The plate has a capacity of about 1.5 Ah.

The figure illustrates the course of the discharge curves A and B in solid lines of accumulators whose positive electrode was activated once according to the process of the example of the invention and which, following two treatments in an aluminum nitrate solution in an atmosphere of saturated steam, contains hydrated nickel aluminate as an active material whose $Ni(OH)_2$ content corresponds to about 4 g. The other plate, whose discharge curves C and D are shown in dotted lines, was impregnated by six conventional impregnations in a nickel nitrate solution. The said figure illustrates the discharge curves at a discharge current intensity (in ampere) corresponding (in ampere-hours) to, respectively, ⅕ normal capacity (according to curves A and C) and the normal capacity (according to curves B and D).

It can be seen from the figure of the drawing that the discharge voltage of an accumulator provided with electrodes activated according to the invention is about 60 mv. above that of an accumulator whose positive electrodes were impregnated with a nickel nitrate solution according to the conventional impregnation process. The capacity with respect to 1 g. $Ni(OH)_2$ amounts with the electrode according to the invention to $$\frac{1.5}{4} = 0.375$$

ampere-hours and, with the known electrodes, to $$\frac{1.69}{6} = 0.283$$

ampere hours.

Of course, the invention should not be construed as being limited by the specific example described and the proportions given herein which are cited by way of example only.

What is claimed is:

1. A process for the manufacture of positive electrodes for alkaline accumulators comprising the step of subjecting an electrolyte-inert, porous and at least partially metallic nickel electrode support to the action of an aqueous solution of an aluminum salt and acting on said electrode support with an atmosphere of steam to form an active material of hydrated nickel aluminate on said support.

2. A process for the manufacture of positive electrodes for alkaline accumulators comprising the steps of immersing an electrolyte-inert, porous and at least partially metallic nickel electrode support in an aqueous solution of aluminum salt, draining excess solution from the support and then acting on said electrode support, having said solution retained therein, with an atmosphere of steam to form an active material of hydrated nickel aluminate on said support, and then drying the so-treated support.

3. The process of claim 2, wherein said solution is aluminum nitrate and wherein said steam atmosphere is saturated and at a temperature of about 75–80° C.

4. The process of claim 2 wherein said aluminum salt is aluminum nitrate in solution and wherein said steam acts on said support for from about 1½ to 2 hours and said steam atmosphere is saturated at a temperature of about 75–80° C.

5. The process of claim 1, including a subsequent step of drying the support, then immersing it in an aqueous alkali hydroxide solution and thereafter washing and drying the resultant support.

6. The process of claim 5, wherein said alkali hydroxide solution is a 25% aqueous potassium hydroxide solution maintained at approximately 80° C. in which immersion is effected for about ½ hour.

7. A process for the manufacture of positive electrodes for alkaline accumulators comprising the steps of immersing an electrolyte-inert, porous and at least partially metallic nickel electrode support for about 2 minutes in an aqueous solution of aluminum nitrate heated to about 70–80° C. draining excess solution from the support, then acting on said support, having said solution retained therein, for about 1½ to 2 hours with an atmosphere of saturated steam maintained at about 75–80° C. to form an active material of hydrated nickel aluminate on said support, drying the so-treated support, then immersing the latter for about ½ hour in a 25% aqueous solution of potassium hydroxide at about 80° C. and thereafter washing and drying the support.

8. A process for the manufacture of positive electrodes for alkaline accumulators, said electrode consisting essentially of an electrolyte-inert, porous and at least partially metallic nickel electrode support and active materials consisting of oxidic compounds distributed within the pores of said support, comprising first the step of subjecting the support to the action of an aqueous solution of aluminum salt and acting on said support, having said solution retained therein, with an atmosphere of saturated steam to form an active material of hydrated nickel aluminate on said support, and then the second step of acting on the resulting support with an aqueous solution of alkali metal hydroxide.

9. The process according to claim 8, wherein said aluminum salt solution is concentrated aluminum nitrate heated to about 70 to 80° C., said saturated steam being maintained at from 75 to 80° C., said first step being allowed to act on said support for about one and one-half to two hours and wherein said alkali metal hydroxide is an aqueous solution of potassium hydroxide maintained at about 80° C. which is allowed to act on the support resulting from the first step for about one-half hour.

References Cited by the Examiner

UNITED STATES PATENTS

| 2,880,257 | 3/1959 | Murphy et al. | 136—122 |
| 2,969,414 | 1/1961 | Fleischer | 136—29 |
| 3,041,388 | 6/1962 | Fukuda et al. | 136—24 |
| 3,228,795 | 1/1966 | Ackermann | 136—29 |

FOREIGN PATENTS

| 581,849 | 8/1959 | Canada. |

WINSTON A. DOUGLAS, *Primary Examiner.*

ALLEN B. CURTIS, *Examiner.*

A. SKAPARS, *Assistant Examiner.*